(12) United States Patent
Neisinger

(10) Patent No.: US 10,320,621 B1
(45) Date of Patent: Jun. 11, 2019

(54) NETWORK LOADING MANAGEMENT SYSTEM AND METHOD

(71) Applicant: Chris S. Neisinger, Danville, CA (US)

(72) Inventor: Chris S. Neisinger, Danville, CA (US)

( * ) Notice: Subject to any disclaimer, the term of this patent is extended or adjusted under 35 U.S.C. 154(b) by 0 days.

(21) Appl. No.: 15/836,897

(22) Filed: Dec. 10, 2017

(51) Int. Cl.
*H04L 12/28* (2006.01)
*H04L 12/24* (2006.01)
*H04L 29/06* (2006.01)
*H04W 24/08* (2009.01)
*H04W 88/16* (2009.01)
*H04L 12/801* (2013.01)

(52) U.S. Cl.
CPC ........ *H04L 41/5009* (2013.01); *H04L 47/127* (2013.01); *H04L 63/0876* (2013.01); *H04W 24/08* (2013.01); *H04W 88/16* (2013.01)

(58) Field of Classification Search
CPC ............... H04L 41/5009; H04L 47/127; H04L 63/0876; H04W 88/16; H04W 24/08
See application file for complete search history.

(56) References Cited

U.S. PATENT DOCUMENTS

| | | | |
|---|---|---|---|
| 2014/0325019 A1* | 10/2014 | Austin | H04L 41/06 709/217 |
| 2017/0331670 A1* | 11/2017 | Parkvall | H04W 52/0274 |
| 2018/0132138 A1* | 5/2018 | Senarath | H04L 41/0813 |

\* cited by examiner

*Primary Examiner* — Phuc H Tran
(74) *Attorney, Agent, or Firm* — Michael A. Kerr; Kerr IP Group, LLC

(57) ABSTRACT

A system for detecting and managing network data traffic and a network load traffic management module is described. The system for detecting and managing network data traffic includes a Radio Access Network (RAN), a plurality of mobile devices, a network load traffic management server, a first dataset and a corresponding first baseline, a second data set and a corresponding second baseline, a data flow dataset, and a probability for one or more mobile devices to remain within each location associated with each RAN site, wherein the probability is calculated by the network traffic management module.

20 Claims, 5 Drawing Sheets

NETWORK LOADING MANAGEMENT SYSTEM AND METHOD

FIELD

The description relates to a network loading management system and method. More specifically, the description relates to the radio access network loading management system and method detecting and managing network data traffic.

BACKGROUND

Typically, network traffic management systems attempt to avoid congestion by applying simple traffic management rules to the types of network traffic, such as the Radio Area Network (RAN) Congestion Awareness Function (RCAF) incorporated into Release 14 of the 3$^{rd}$ Generation Partnership Project (3GPP) standard. Frequently, these traffic management rules simply target predetermined types of traffic such as peer-to-peer (P2P) or the like that are most likely to cause congestion.

In other cases, traffic management rules may provide for traffic management during peak hours by limiting bandwidth per user during these peak times. These types of solutions can, in some cases, lower the Quality of Service (QoS) by affecting clients even when there is no actual congestion, restricting the clients from using bandwidth that would otherwise be available to them.

Additionally, the existing solutions may not even solve network congestion problems, because the enforcement policies are less than what is required to relieve congestion or fail to anticipate network congestion events. For example, there may be few or no heavy users or a low amount of low priority traffic, such as peer-to-peer (P2P) or bulk downloads, yet poorly targeted traffic management rules may cause the network to still experience congestion events.

It would, therefore, be beneficial to provide load management systems and methods that anticipate network congestion events and metrics by applying dynamic traffic management policies that accurately target sources of network congestion.

SUMMARY

A system for detecting and managing network data traffic and a network load traffic management module is described. The system for detecting and managing network data traffic includes a Radio Access Network (RAN), a plurality of mobile devices, a network load traffic management server, a first dataset and a corresponding first baseline, a second data set and a corresponding second baseline, a data flow dataset, and a probability for one or more mobile devices to remain within each location associated with each RAN site, wherein the probability is calculated by the network load traffic management module.

The radio access network (RAN) is associated with a service provider network. The RAN includes a plurality of RAN sites, in which each RAN site has a coverage area. Mobile devices are communicatively coupled to the RAN. The network load traffic management server includes a network traffic management module and a database that operate on a server processor and a server memory. The network load traffic management server is communicatively coupled to the RAN. The first dataset is received by the network traffic management module, in which the first dataset is associated with network components corresponding to the RAN. The second dataset is received by the network traffic management module, in which the second dataset corresponds to data flows associated with the mobile devices communicatively coupled to the RAN.

The first baseline is generated with the first dataset for each RAN site in the service provider network. The first baseline is generated with at least one of a first historical dataset and a first recent dataset. The second baseline is generated with at least one Key Performance Indicator (KPI) for each RAN site in the service provider network. The baseline is generated with at least one of a historical KPI dataset and a recent KPI dataset. The data flow dataset is tagged with a unique identifier for each mobile device. The data flow dataset is configured to be stored in the database, which is regularly updated with a recent data flow dataset associated with each mobile device.

The location of the mobile devices is associated with the appropriate RAN site. A location change is detected for each mobile device. A probability is calculated for one or more mobile devices that remain within each location associated with each RAN site. The probability is calculated by the network traffic management module. Also, the probability may be determined for one or mobile devices to remain within the location associated with a particular RAN for a period of time.

Additionally, the system for detecting and managing network data may include a projection generated based on the baseline level of utilization, in which the projection is associated with a future time period. Furthermore, access to the projection is provided with an Application Programming Interface (API).

In one illustrative embodiment, the first dataset includes a utilization dataset associated with the utilization of radio resources that includes a current utilization of radio resources. The utilization dataset may be associated with the utilization of radio resources includes a capacity utilization of radio resources.

In another illustrative embodiment, the KPI for each RAN site includes a mobility KPI associated with changing the mobile device location. In another illustrative embodiment, the KPI for each RAN site includes a utilization KPI associated with the utilization of the network components.

A network load traffic management method is also described. The method includes receiving a first dataset associated with a plurality of network components corresponding to a Radio Access Network (RAN), wherein the first dataset is communicated to a network traffic management module. The method also includes receiving a second dataset corresponding to a plurality of mobile device data flows, in which the second dataset is associated with a service provider network that includes the RAN. The second dataset is communicated to the network traffic management module. A first baseline is generated with the first dataset for each RAN site in the service provider network. The first baseline is generated with at least one of a first historical dataset and a first recent dataset. A second baseline is generated with at least one Key Performance Indicator (KPI) for each RAN site in the service provider network, in which the baseline is generated with at least one of a historical KPI dataset and a recent KPI dataset. The method then proceeds to tag a data flow dataset with mobile device identification information. The data flow dataset is configured to be stored in a database, which is regularly updated with the data flow dataset. The mobile devices that correspond to each RAN site based on a mobile device location. The method determines the location change for each mobile device and then determines a probability for one or more mobile devices to remain within each location associated with each RAN site.

In one illustrative embodiment, the probability for one or mobile devices to remain within the location for a period of time is determined by the network traffic management module.

In another illustrative embodiment, the method includes generating a projection based on the baseline level of utilization, wherein the projection is associated with a future time period. The method provides access to the projection with an Application Programming Interface (API).

DRAWINGS

The present subject matter will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. Additionally, the methods may vary as to details, order of the actions, or other variations without departing from the illustrative methods disclosed herein.

The systems and methods described herein address network congestion issues and apply dynamic traffic management rules that accurately target sources of network congestion. More specifically, the systems and methods detect and manage network data traffic during periods of network congestion from real-time network event and measurement data. Thus, the methods and systems described herein identify periods of congestion from historical and recent data. The system and method may include tagging data flows with user device identification information to create an active database of devices associated within a Radio Access Network (RAN).

A Radio Access Network (RAN) is part of a telecommunication system that utilizes a Radio Access Technology (RAT). The RAN resides between User Equipment (UE) and provides a connection to a Core Network (CN). RAN site is related to a site coverage area and may include a cell site, a sector, a frequency or any other parameter associated with the RAN site that may be monitored, controlled or the combination thereof. User Equipment (UE) includes devices such as a smartphone, mobile phones, a computer, an IoT device, and other such devices. Radio Access Technologies (RATs) refers to the underlying physical connection method for a radio-based communication network. For example, a smartphone may contain several RATs such as Bluetooth, Wi-Fi, 3G, 4G, and LTE. Data flow is measured in bytes per second.

In general, the systems and methods for handling network congestion optimize capacity utilization. Capacity utilization is the extent to which an enterprise uses its installed productive capacity. It is the relationship between output that is produced with the installed equipment and the potential output which could be produced if the capacity was fully used. Thus, capacity utilization is the ratio of actual output to potential output.

By way of example and not of limitation, the system and method described herein may be configured to pace the downlink for certain network users identified as "heavy hitters," in order to optimize the customer experience of all users on the network.

Figure 1A:
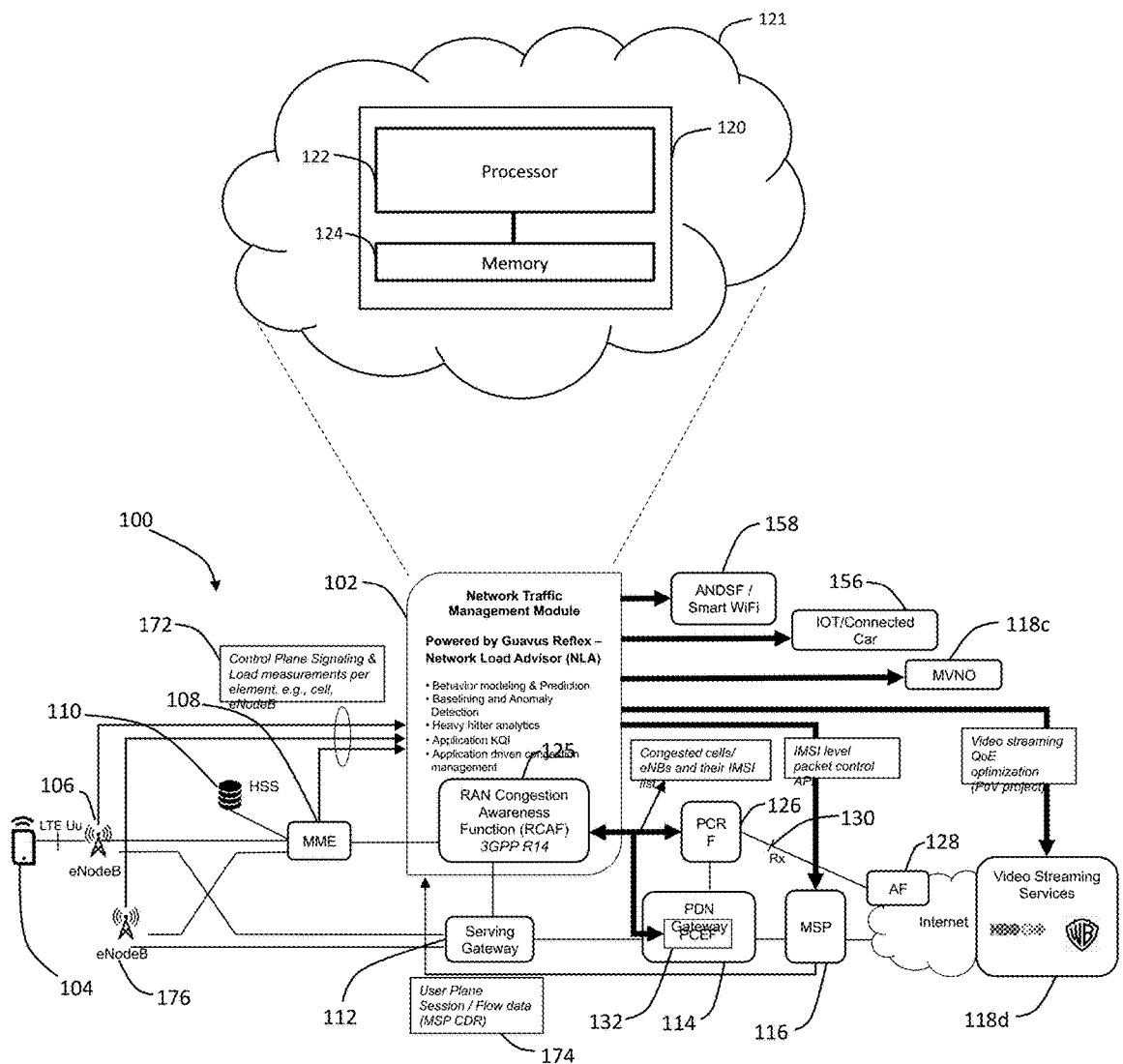
FIG. 1A shows an illustrative traffic management module incorporated into a network traffic management and detection system.

Referring to FIG. 1A, there is shown an illustrative an illustrative radio access network (RAN) system 100, e.g. an LTE network, which provides mobile devices 104, i.e. User Equipment (UE), such as a smartphone with Internet connectivity. The illustrative RAN system 100 includes a network traffic management module 102 for detecting and managing network data. The illustrative mobile device 104 communicates with at least one eNodeB 106. The illustrative mobile device 104 may include an International Mobile Subscriber Identity (IMSI).

More generally, the illustrative mobile device 104 may include a personal computer, a laptop, a tablet computer, a smartphone. The mobile device 104 may be operationally coupled to a wide area network (WAN) such as the Internet by being communicatively coupled to a Radio Access Network (RAN) associated with a service provider network. The mobile device 104 may also be communicatively coupled to the WAN via a Wi-Fi (or Bluetooth) access point (not shown) that is communicatively coupled to an illustrative modem (not shown), which is communicatively coupled to the WAN.

The network traffic management module 102 may be embodied in a network load traffic management server 120 that resides in a cloud service 121. The illustrative network load traffic management server 120 includes a server processor 122 and a server memory 124. The illustrative network load traffic management server includes a network traffic management module and a database that operate on a server processor and a server memory. The network load traffic management server is communicatively coupled to the RAN.

The illustrative cloud service 121 may be embodied as one of four fundamental cloud service models, namely, infrastructure as a service (IaaS), platform as a service (PaaS), software as a service (SaaS), and network as a service (NaaS). The cloud service models are deployed using different types of cloud deployments that include a public cloud, a community cloud, a hybrid cloud, and a private cloud.

Infrastructure as a service (IaaS) is the most basic cloud service model. IaaS providers offer virtual machines and other resources. The virtual machines, also referred to as "instances," are run as guests by a hypervisor. Groups of hypervisors within the cloud operational support system support large numbers of virtual machines and the ability to scale services up and down according to customers' varying requirements. IaaS clouds often offer additional resources such as images in a virtual machine image library, raw (block) and file-based storage, firewalls, load balancers, IP addresses, virtual local area networks (VLANs), and software bundles. IaaS cloud providers supply these resources on demand from their large pools installed in data centers. For wide area connectivity, the Internet can be used or virtual private networks (VPNs) can be used.

Platform as a service (PaaS) enables cloud providers to deliver a computing platform that may include an operating system, a programming language execution environment, a database, and a web server. Application developers can develop and run their software solutions on the PaaS without the cost and complexity of buying and managing the underlying hardware and software layers. With some PaaS solutions, the system resources scale automatically to match application demand, so the cloud end user does not have to allocate resources manually.

Software as a service (SaaS) enables cloud providers to install and operate application software in the cloud. Cloud end users access the software from cloud clients. The cloud end users do not manage the cloud infrastructure and platform that runs the application. The SaaS application is different from other applications because of scalability. Higher throughput can be achieved by cloning tasks onto multiple virtual machines at run-time to meet the changing work demand. Load balancers in the SaaS application distribute work over a set of virtual machines. To accommodate a large number of cloud end users, cloud applications may be multitenant and serve more than one cloud end user organization. Some SaaS solutions may be referred to as desktop as a service, business process as a service, test environment as a service, communication as a service, etc.

The fourth category of cloud services is Network as a service (NaaS), in which the capability provided to the cloud service end user is to use a network/transport connectivity services, an inter-cloud network connectivity services, or the combination of both. NaaS involves the optimization of resource allocations by considering network and computing resources as a unified whole and traditional NaaS services include flexible and extended VPN, and bandwidth on demand.

There are different types of cloud deployment models for the cloud based service, which include a public cloud, a community cloud, a hybrid cloud, and a private cloud. In a public cloud, applications, storage, and other resources are made available to the general public by a service provider. These services are free or offer a pay-per-use model.

The community cloud infrastructure is between several organizations from a community with common concerns, and can be managed internally or by a third-party and hosted internally or externally; so the costs are spread over fewer users than a public cloud (but more than a private cloud).

The private cloud infrastructure is dedicated for a single organization, whether managed internally or by a third-party and hosted internally or externally. A private cloud project requires virtualizing the business environment, and it requires that the organization reevaluate decisions about existing resources.

The hybrid cloud is a composition of two or more clouds (private, community or public) that remain unique entities but are bound together, offering the benefits of multiple deployment models. Hybrid cloud architecture requires both on-premises resources and off-site (remote) server-based cloud infrastructure. Although hybrid clouds lack the flexibility, security, and certainty of in-house applications, the hybrid cloud provides the flexibility of in-house applications with the fault tolerance and scalability of cloud-based services.

Referring back to FIG. 1A the illustrative radio network system 100 provides User Equipment 104 (UE) such as a smartphone with Internet connectivity. When a mobile device 104 has data to send to or receive from the Internet, it sets up a communication channel between itself and the Packet Data Network Gateway 114. This involves message exchanges between the UE 104 and the Mobility Management Entity (MME) 108.

In coordination with the eNodeB base station 106, the Serving Gateway 112, and the Packet Data Network Gateway 114, data plane tunnels are established between the base station 106 and the Serving Gateway 112, and between the Serving Gateway 112 and the Packet Data Network Gateway 114. The network establishes a virtual communication channel, called an EPS bearer, to connect the UE and the base station.

For network access and service, entities in the illustrative network 100 exchange control plane messages. A specific sequence of such control plane message exchange is called a network procedure. For example, when a mobile device 104 powers up, it initiates an attach procedure with the MME 108, which includes establishing a radio connection to the base station 106. Thus, each network procedure involves the exchange of several control plane messages between two or more entities. The specifications for these are defined by the various 3GPP Technical Specification Group.

The 3GPP R14 includes a Radio Congestion Awareness Function 125 (RCAF), which is an element that provides a RAN User Plane Congestion Information (RUCI) to the Policy and Charging Rules Function 126 (PCRF) to enable the PCRF 126 to take the RAN 100 user plane congestion status into account for policy decisions. In operation, the RCAF 125 integrates with RAN O&M to collect the information related to UE congestion, the impacted base station 106 (eNodeB) and interrogates the MME 108 to get the impacted subscribers and services. Afterward, the RCAF 125 updates the PCRF 126 with such information, so the PCRF 126 can make decisions or implement policies to handle the subscribers/services currently in congestion.

The Policy and Charging Rules Function (PCRF) 126 is the software node designated in real-time to determine policy rules in a multimedia network. As a policy tool, the PCRF 126 plays a central role in next-generation networks. The PCRF 126 is a software component that operates at the network core and accesses subscriber databases and other specialized functions, such as a charging system, in a centralized manner. Because it operates in real time, the PCRF 126 has an increased strategic significance and broader potential role than traditional policy engines. The PCRF 126 is the part of the network architecture that aggregates information to and from the network, operational support systems, and other sources (such as portals) in real time, supporting the creation of rules and then automatically making policy decisions for each subscriber active on the network. Such a network might offer multiple services, quality of service (QoS) levels, and charging rules.

The Application Function 128 (AF) interacts with applications or services and extracts session information from the application signaling and provides it to the PCRF 126. The Rx 130 reference point resides between AF 128 and PCRF 126. The AF 128 provides the following application session related information to the PCRF 126: Subscriber Identifier, IP address of the UE, Media Type and Format, Bandwidth, Flow description e.g. Source and Destination IP addresses and the protocol, AF Application Identifier, AF Communication Service Identifier, AF Application Event Identifier, AF Record Information, Flow Status, Priority Indicator and Emergency Indicator.

The Policy Charging and Enforcement Function 132 (PCEF) is located in the PDN Gateway 114. The PCEF 132 provides service data flow detection, user plane traffic handling, trigger control plan session management, QoS handling, service data flow measurement, and online/offline charging interactions. The PCEF 132 allows a particular data flow to pass through a PCEF only if the gating function allows. The PCEF 132 enforces the authorized QoS of service data flow according to an active Policy Control and Charging (PCC) rule. For service data flow that is subject to charging control, the PCEF 132 will allow the service data flow to pass through the PCEF 132 if and only if there is a corresponding Policy Control and Charging (PCC) rule.

Current RAN network monitoring depends on cell-level aggregate Key Performance Indicators (KPI). Existing practice is to use performance counters to derive these KPIs. The derived KPIs are then monitored by domain experts, aggregated over certain pre-defined time window. Based on domain knowledge and operational experience, these KPIs are used to determine if service level agreements (SLA) are met.

An illustrative set of LTE KPIs includes radio network KPIs such as Accessibility KPIs, Retainability KPIs, Mobility KPIs, Availability KPIs, Utilization KPIs, and Traffic KPIs. The illustrative set of radio network KPIs focuses on radio network performance. Additionally, the illustrative set of LTE KPIs may also include service KPIs such as Latency KPIs and Integrity KPIs. The service KPIs focus on the user experience.

Service Level Agreement (SLA) can contribute to determining how customer care is perceived and aiding service providers in attracting customers and maintaining customer loyalty. An SLA is an element of a formal, negotiated contract between two parties such as a service provider and a customer. SLAs can include many aspects of a service, such as performance objectives, customer care procedures, billing arrangements, service provisioning requirements and other such services.

SLAs are supported by service or product Key Quality Indicator (KQIs). Service KQIs are the key indicators of the service element performance and used as the primary input for management of internal or supplier/partner SLAs that calculate actual service delivery quality against design targets or in the case of supplier/partner contractual agreements. Service KQIs provide the main source of data for the product KQIs that are required to manage product quality and support the contractual SLAs with the customer.

KQIs are supported by Key Performance Indicators (KPIs) that are an indication of service resource performance. Product KQIs and Service KQIs are associated with a customer focus. KPIs are associated with a network focus. For purposes of this patent application, the focus will be on KPI, even though there is a direct relationship between KPIs and KQIs.

Figure 1B:
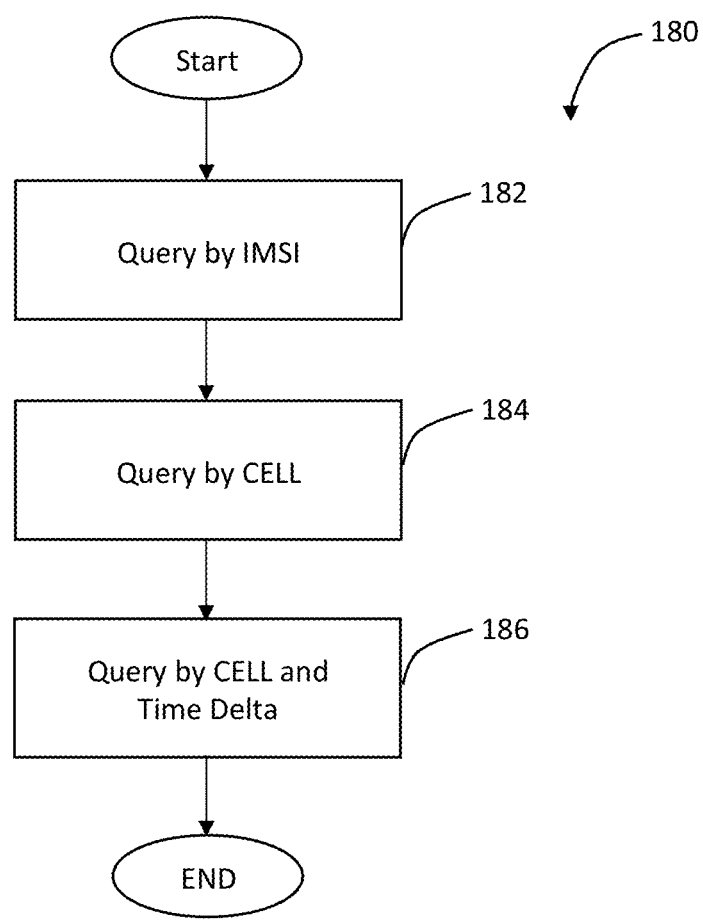
FIG. 1B shows an illustrative flowchart of API procedures.
Figure 2:
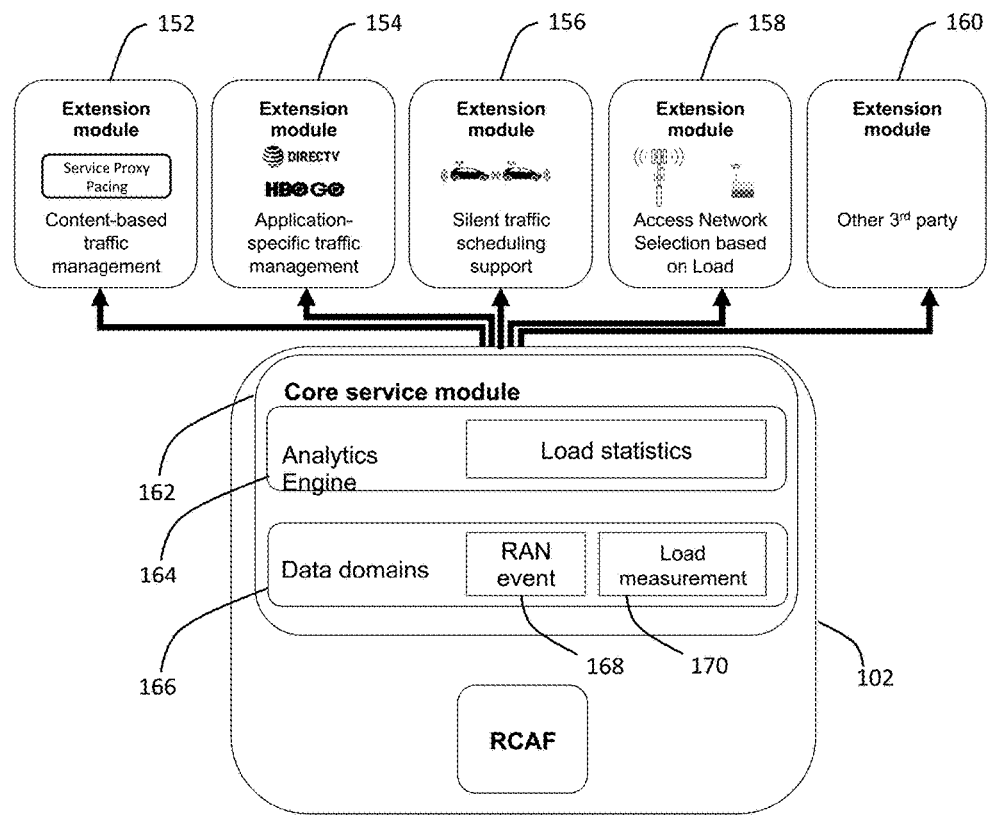
FIG. 2 shows a block diagram of network traffic flow through the illustrative network traffic management and detection system.

Referring to FIG. 1A, FIG. 1B and FIG. 2, there is shown an illustrative network load traffic module 102 that detects and manages network data traffic. In addition, to providing the functionality of RAN Congestion Awareness Function 125 (RACF), the network load traffic module is communicatively coupled to a variety of extension modules. For example, the extension modules may include a service proxy pacing extension module 152, an application specific traffic management extension module 154, a silent traffic scheduling extension module 156, an access network extension module 158, and an illustrative third-party extension module 160.

The service proxy pacing extension module 152 and application specific traffic management module 154 may be configured to operate in a similar manner, which supports video pacing downloads as described in further detail below.

By way of example and not of limitation, the silent traffic scheduling extension module 156 may be configured to operate in a connected car application where firmware updates and media synchronization are considered "heavy traffic" applications that are important, but not time sensitive. Thus, the firmware updates and media synchronization need to be scheduled to avoid congestion.

The illustrative access network extension module 158 is configured to be communicatively coupled to a Wi-Fi access point (not shown) so that when the RAN is congested, then a Wi-Fi offload is performed to a Wi-Fi operator. However, when the RAN is not congested, the Wi-Fi offload is not performed to avoid having to pay Wi-Fi operator traffic fees.

Third party extension modules 160 may operate in a manner similar to the extension modules described above. Additionally, the third-party extension modules may be associated with social networking, gaming, news, productivity and other such third-party applications.

Referring now to FIG. 2, the illustrative network load traffic module 102 includes a Core Services Module 162. The Core Services Module 162 further includes an Analytics Engine Module 164 that receives data from Data Domains Module 166. The Data Domains Module may be embodied in a relational database such as a MySQL database.

Referring to FIGS. 1A and 2, the illustrative Data Domains Module 166 is configured to record RAN Events 168. RAN Events 168 may include unscheduled RAN event information such as unscheduled eNodeB outages, non-predictive loading condition, mobile reporting component measurements. Additionally, RAN Events 168 may include scheduled RAN event information such as scheduled eNodeB outages, scheduled maintenance, forecast RAN coverage conditions such as anticipated loading conditions based on historical patterns.

Referring to FIG. 2, the illustrative Data Domains Module 166 is also configured to record Load Measurements 170, which may be based on measurements of the various radio resource utilization including but not limited to the total transmit power, total noise floor, and code usage. Radio resource management function includes admission control, congestion control, channel switching and bearer reconfiguration, code resource management, and packet scheduling. Most of the specific procedures for these functions are not subject to 3GPP standardization and considered a major differentiating factor between equipment manufacturers.

The illustrative Analytics Engine 164 may include a load statistics module 172 that generates statistics from the database and may also implement business rules or procedures that correspond to a triggering event, which may be derived from exceeding a threshold in the data domains module 166.

Returning to FIG. 1A, In the illustrative embodiment, an illustrative first dataset is received by the network traffic management module 102. The first dataset is associated with network components corresponding to the RAN as represented by block 172. For example, the first dataset may be generated from control plane signaling and load measurements based on each network element. In the illustrative embodiment, the network elements may include cells, base stations, eNodeB base stations or other such network elements.

In one illustrative embodiment, the first dataset includes a utilization dataset associated with the utilization of radio resources that includes a current utilization of radio resources. The utilization dataset may be associated with the utilization of radio resources including a capacity utilization of radio resources A first baseline is generated with the first dataset for each RAN site in the service provider network. The first baseline may be generated with a first historical dataset, a first recent dataset or the combination thereof. For example, the historical dataset may be associated with control plane signaling and load measurements based on each network element.

An illustrative second dataset is also received by the network traffic management module. The second dataset corresponds to data flows associated with the mobile devices communicatively coupled to the RAN as reflected in block 174. In the illustrative embodiment, the second dataset may be associated with a User Plane Session, flow data corresponding to the Managed Service Provider, flow data corresponding to the Charging Data Record (CDR), or any module component or such network element.

A second baseline may also be generated with at least one Key Performance Indicator (KPI) for each RAN site in the service provider network. The baseline is generated with a historical KPI dataset, a recent KPI dataset or any combination thereof, which may be associated with the MSP 116, the PCRF 126, the PDN Gateway 114 or any other such network element, network component, network module or other such network element associated with a mobile device 104.

In another illustrative embodiment, the KPI for each RAN site includes a mobility KPI associated with changing the mobile device location. In another illustrative embodiment, the KPI for each RAN site includes a utilization KPI associated with the utilization of the network components.

At block 174 of the illustrative embodiment, the data flow dataset is tagged with an identification for each mobile device. The data flow dataset is configured to be stored in the database, which is regularly updated with a recent data flow dataset associated with each mobile device.

The location of the mobile devices is associated with the appropriate RAN site. The location of the mobile device 104 may be associated with a base station 106, which is communicatively coupled to the mobile device 104. A location change may be detected for each mobile device by determining when a handoff occurs between base stations such when the mobile device terminates communication with eNodeB 106 and moves to eNodeB 176.

The illustrative network traffic management module 102 calculates a probability for one or more mobile devices that remain within each location associated with each RAN site. Also, the network traffic management module 102 may calculate another probability for one or mobile devices to remain within the location associated with a particular RAN for a period of time.

Additionally, the network traffic management module 102 generates a projection based on the baseline level of utilization, in which the projection is associated with a future time period. Furthermore, access to the projection may be performed with an Application Programming Interface (API).

Various elements of the network traffic management module 102 may physically reside in or near a RAN site or a central RAN facility. Additionally, the network traffic management module may include operations that operate using an illustrative RESTful API, which allows requesting systems to access and manipulate textual representations of Web resources using a uniform and predefined set of stateless operations. In a RESTful Web service, requests made to a resource's URI receive a response that may be in XML, HTML, JSON or some other defined format. The response may confirm that some alteration has been made to the stored resource, and it may provide hypertext links to other related resources or collections of resources. By using a stateless protocol and standard operations, REST systems aim for fast performance, reliability, and the ability to grow, by re-using components that can be managed and updated without affecting the system as a whole, even while it is running.

A RESTful API breaks down a transaction to create a series of small modules, in which each module addresses a particular underlying part of the transaction. This modularity provides developers with a great deal of flexibility, but it can be challenging for developers to design from scratch. RESTful API explicitly takes advantage of HTTP methodologies defined which use GET to retrieve a resource and POST to create that resource.

Referring now to FIG. 1B, there is shown an illustrative flow chart of the procedures performed by the network traffic management module 102. At the block 182, the first procedure may include querying each mobile device, e.g. IMSI. The querying of each mobile device may include returning a Service Cell Identifier and Cell Location, returning a Cell Load Factor and current nominal expected service level, returning an IMSI Mobility Factor (fixed, stationary, pedestrian, slow, medium, high speed), or any combination thereof.

The method may then proceed to block 184 where a query by cell site or base station may be performed. The query may include returning Cell Load Factor and current nominal expected service level, IMSI list of all devices associated with the CELL, or any combination thereof. At block 186, a query by cell site and a time delta may be performed, which returns projected future cell load factor and confidence indicator.

Figure 3:
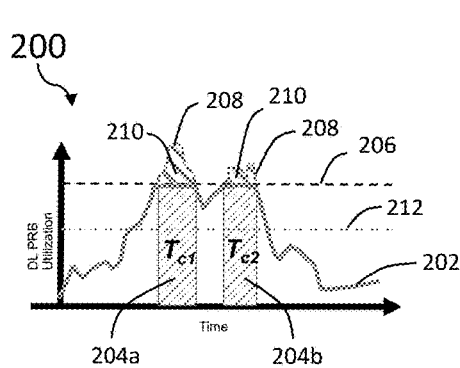
FIG. 3 shows an illustrative graph of network data traffic for a period of time without downlink pacing by the traffic management module.

Referring now to FIG. 3, there is shown a graph 200 of illustrative network data traffic at an eNodeB 106 measured over time, without any downlink pacing, such as when data traffic at an eNodeB 106 is managed by a simple RCAF as incorporated into Release 14 of the 3GPP standard. The utilization of the eNodeB 202 reflects the amount of data traffic on the network. The graph 200 depicts two periods of congestion, $T_{c1}$ 204a and $T_{c2}$ 204b, during which times the utilization 202 reaches the maximum threshold or capacity 206 of the eNodeB 106. During these times of congestion $T_{c1}$ 204a and $T_{c2}$ 204b, actual utilization or capacity demand 208 on the eNodeB 106 exceeds the capacity 206 of the eNodeB 106. The shaded area enclosed by the utilization capacity 206 and the capacity demand 208 represents data traffic tonnage that is lost or blocked 210 due to resource limitation. During the periods of congestion $T_{c1}$ 204a and $T_2$ 204b, customer experience and key performance indicators (KPIs) decrease because of the data traffic lost or blocked 210.

The graph 200 further includes an indication of the average utilization 212 of the eNodeB 106. Because average utilization is commonly used by service providers to determine when, where, and whether to expand capacity in a location or of a particular eNodeB 106; and because the average utilization 212 does not accurately reflect the occurrence of periods of congestion where utilization capacity is exceeded, average utilization rarely triggers growth of the utilization capacity in such congested eNodeB 106 units. However, the pacing solution offered by the traffic management module 102 diminishes the need for increased capacity.

In the illustrative embodiment, the network traffic management module 102 receives load factor information from the eNodeB 106 and/or the MME 108. From the load factor information, the traffic management module 102 determines a degree of capacity utilization for one or more eNodeB 106 units, and a predicted baseline level of capacity utilization for a future time. From the degree of capacity utilization and the predicted future time capacity utilization, the traffic management module 102 identifies "heavy hitting" users, paces the downlink for these users from some time prior to a predicted period of congestion until a later time after that time period. The traffic management module 102, therefore improves customer experience by spreading downlink traffic throughout a time period in order to reduce congestion during peak traffic time periods.

Figure 4:
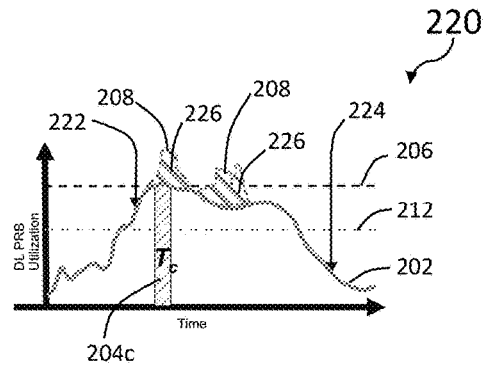
FIG. 4 shows an illustrative graph of network data traffic for a period of time with downlink pacing by the traffic management module.

Referring now to FIG. 4, there is shown a graph 220 of the same network data traffic 202 at the same eNodeB 106 measured over time as in FIG. 3, but here the traffic management module 102 enables downlink pacing that alleviates network congestion. The traffic management module 102 predicts network congestion using the load factor information received from the eNodeB 106 and initiates downlink pacing of certain users or IMSI devices 104 to prevent and/or mitigate network congestion. Arrow 222 indicates the onset of downlink pacing, in order to distribute the network data traffic incident at the eNodeB 106 over a greater span of time. Arrow 224 indicates the termination of downlink pacing and a return to normal service. During the period of time from downlink pacing onset 222 until termination 224, the periods of congestion $T_{c1}$ 204a and $T_{c2}$ 204b in FIG. 3 are reduced to a single shorter period of congestion $T_c$ 204c. During the period of pacing and this reduced period of congestion $T_c$ 204c, customer experience, and KPIs are improved over the customer experience and KPIs associated with graph 200. The traffic management module 102 smoothes utilization peaks, thereby accommodating the capacity demand 208 and allowing all downlinks to proceed with minimal or no impediments. The shaded area 226 represents the data tonnage that the traffic management module 102 allocates across the period of pacing from arrow 222 through arrow 224. Thus, the traffic management module 102 allows the eNodeB 106 to accommodate users and IMSI devices 104 even during periods of peak demand, represented by the shaded areas 226 that extend above the capacity 206 of the eNodeB 106.

In the illustrative embodiment, the load factor information is received in response to a query by the traffic management module 102. The eNodeB 106 and the MME 108 provide load factor information to the traffic management module 102 including a current nominal expected service level, location, active IMSI devices, and a mobility factor for each IMSI device 104.

Figure 5:
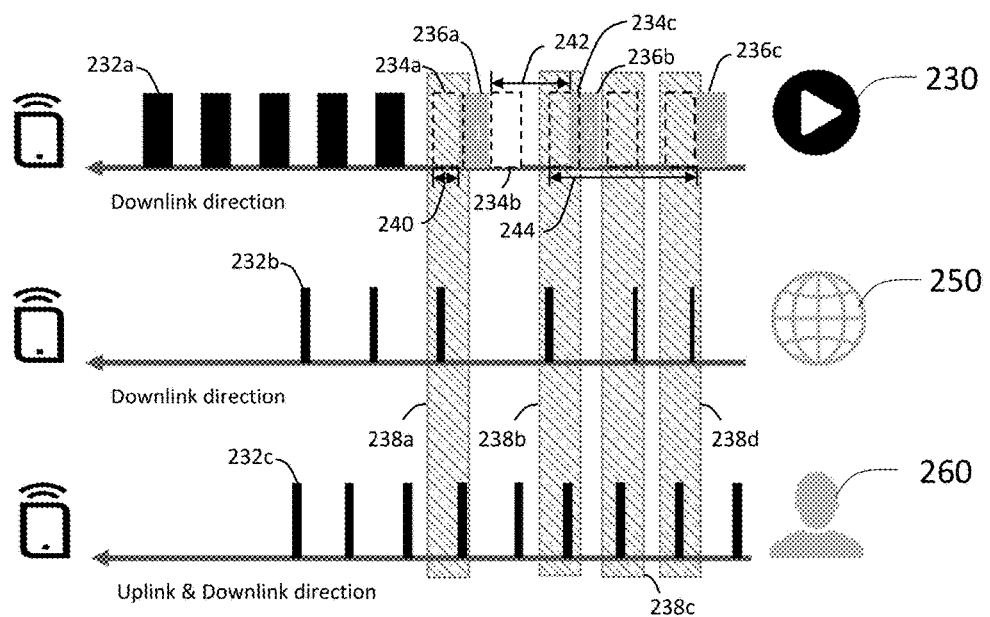
FIG. 5 shows exemplary downlink transmissions over time and pacing of a heavy hitter downlink.

Referring now to FIG. 5, there are shown three (3) illustrative IMSI device downlinks running simultaneously on the same RAN 106, a video streaming downlink 230, a webpage downlink 250, and an interactive audio downlink 260. The video streaming downlink 230 can include MP4 files, X-MPEG files, or similar video file formats. The webpage downlink 250 can include text, html, or any other similar format. The interactive audio downlink 260 can include telephony data packets, audio files, other audio data or any combination thereof.

The traffic management module 102 receives status and hardware information from one or more RAN or eNodeB 106 or one or more MMEs 108. The status and hardware information can include a utilization capacity 206 or maximum bandwidth of each eNodeB 106, a current utilization for each eNodeB 106, a list of IMSI devices 104 communicating with each eNodeB 106, a location of each eNodeB 106, and a location of each IMSI device 104. The status and hardware information can range over a historical period of time from the present backward. The traffic management module 102 can use the historical location data to determine mobility factors for each IMSI device 104. Mobility factors can indicate a status of an IMSI device 104 that correlates to the probability of the IMSI device 104 will remain in communication with the eNodeB 106 for a future period of time, such as fixed, stationary, pedestrian, slow speed, medium speed, and high speed.

Once an eNodeB 106 has been registered by the traffic management module 102, the traffic management module can recognize the video streaming downlink 230 of a heavy hitting user, anticipate an upcoming period of congestion, and initiate pacing of the video streaming downlink 230 to accommodate users and IMSI devices 106 during the period of congestion. Each solid bar 232a, 232b, 232c represents a downlink data packet. The width of the downlink data packet 232 reflects the volume of data contained in the downlink data packet 232. The transparent bars 234 represent the anticipated or predicted data packets of the video streaming downlink 230 in the absence of downlink pacing by the traffic management module 102. With downlink pacing initiated, paced data packets 236a, 236b, and 236c replace the predicted data packets 234 of the video streaming downlink 230.

In operation, the traffic management module 102 initiates downlink pacing when the webpage downlink 250 and the interactive audio downlink 260 become active, placing a new load on the RAN 106 and creating the potential for future congestion. The shaded boxes 238a, 238b, 238c, and 238d highlight potential periods of congestion, where each of the video streaming downlink 230, the webpage downlink 250, and the interactive audio downlink 260 would have congested the RAN 106 by sending data packets 232 during the same time period. Thus, as the RAN utilization increases due to the additional active downlinks, pacing of the video streaming downlink 230 accommodates all downlinks by allowing the video streaming downlink 230, the webpage downlink 250, and the interactive audio downlink 260 to run simultaneously without exceeding the capacity of the eNodeB or RAN 106. In the illustrative example, the webpage downlink 250, and the interactive audio downlink 260 continue unchanged, while only the video streaming downlink 230 is paced.

In one embodiment, downlink pacing can be a gradual/compounded process. In the gradual or compounded process, the traffic management module 102 initiates pacing by delaying the video stream downlink 230 data packet 234a for x milliseconds 240. The traffic management module 102 then delays the following video stream downlink 230 data packet 234b for y milliseconds 242, where y>x. Next, the traffic management module 102 delays a third video stream downlink 230 data packet 234c for z milliseconds 244, where z>y. Similarly, the traffic management module 102 terminates downlink pacing gradually by allowing paced data packets 236 to be transmitted more frequently.

In another embodiment, the traffic management module 102 initiates downlink pacing immediately by delaying the video stream downlink 230 data packet 234*a* for a number of milliseconds equal to the time between every paced downlink data packet.

Figure 6:
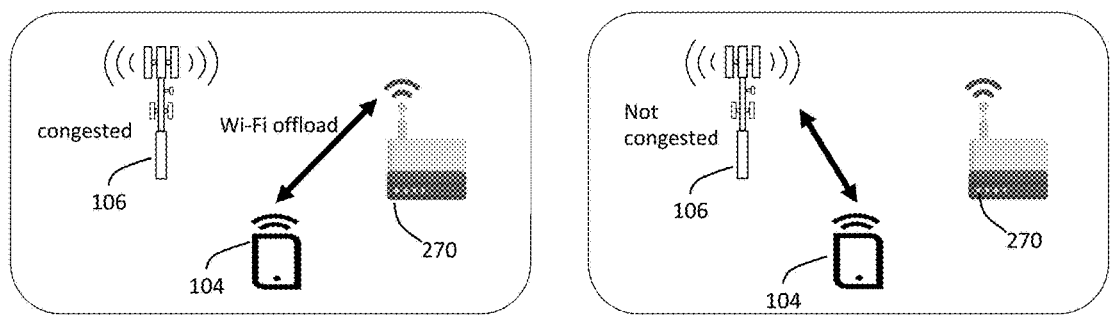
FIG. 6 shows an illustrative block diagram of an extension module to offload a congested base station (eNodeB) to a Wi-Fi module.

Referring now to FIG. 6, there is shown a further embodiment wherein the traffic management module 102 initiates offloading of certain downlinks or IMSI devices 104 to a wireless fidelity (Wi-Fi) network 270 to reduce congestion at an eNodeB 106. In one embodiment, the traffic management module 102 attempts to offload appropriate IMSI devices 104 to an available Wi-Fi network 270 prior to initiating pacing of any heavy hitting user. In another embodiment, the traffic management module 102 attempts to offload appropriate IMSI devices 104 to an available Wi-Fi network 270 while initiating pacing of any heavy hitting user. After the period of congestion, the traffic management module 102 seamlessly switches the IMSI device 104 back to the eNodeB 106.

Figure 7:
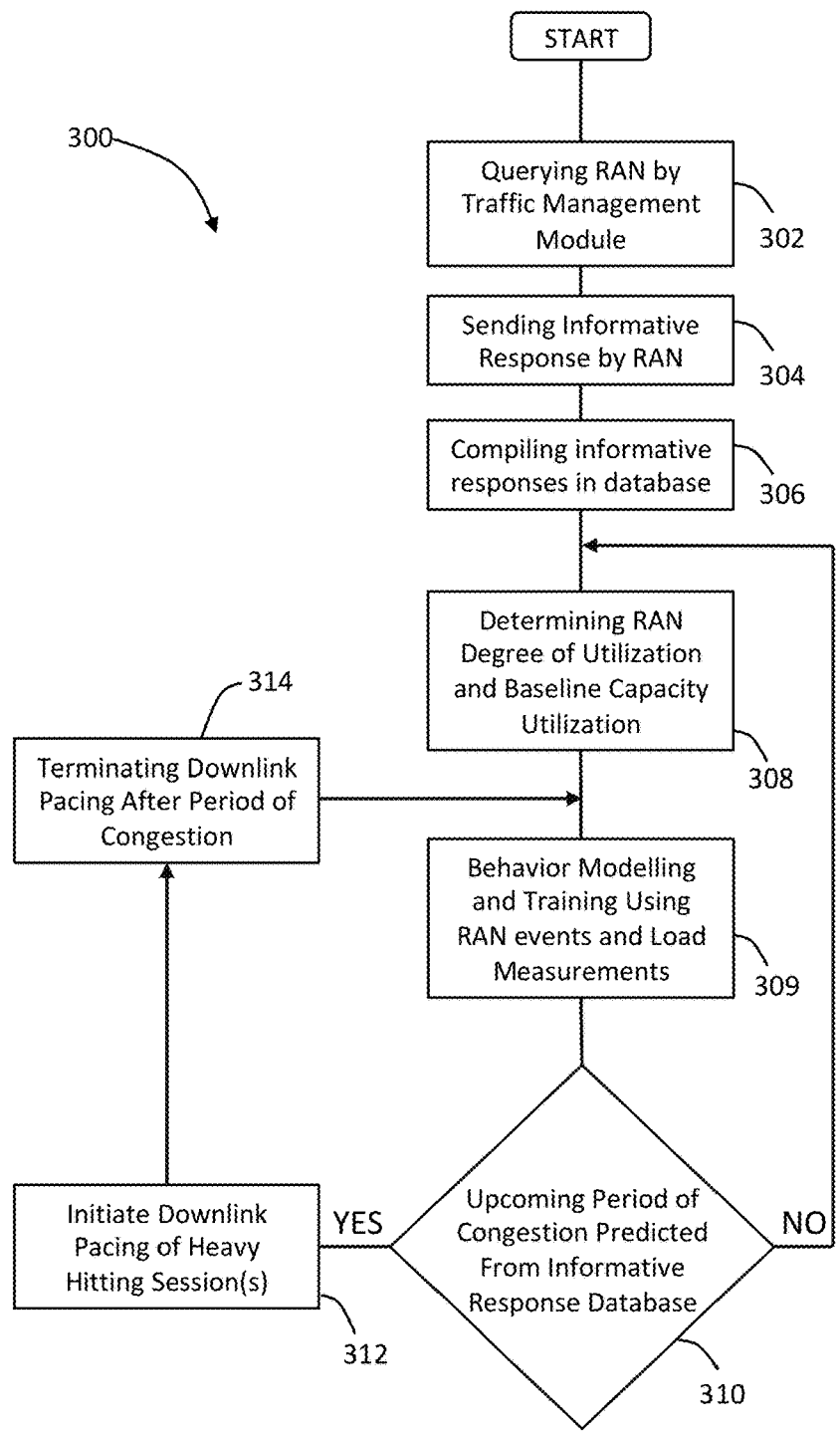
FIG. 7 shows an illustrative flow chart depicting the network traffic management and detection for pacing a downlink between the RAN and a mobile device.

Referring now to FIG. 7 and FIG. 1A, there is shown an illustrative flow chart 300 of the illustrative method for detecting and managing network data traffic. The method begins when the traffic management module 102 queries one or more RAN 106 or MME 108 for an informative response at step 302. The method proceeds with the one or more RAN 106 or MME 108 sending informative responses to the traffic management module 102 at step 304. The informative response can include a utilization capacity 206 or maximum bandwidth of each eNodeB 106, a current utilization for each eNodeB 106, a list of IMSI devices 104 communicating with each eNodeB 106, a location of each eNodeB 106, and a location of each IMSI device 104. The traffic management module 102 then compiles, sorts, and stores the information contained in the various informative responses in a database at step 306.

At step 308 the traffic management module 102 determines a degree of utilization and baseline capacity of each eNodeB 106. In a further embodiment, the traffic management module 102 determines a mobility factor for each IMSI device 104 listed as active for each eNodeB 106. At training process block 309, behavior modeling and training using RAN events and load measurement are performed.

Next, the traffic management module predicts time periods of congestion based on the informative responses, the degree of utilization, the baseline capacity, the mobility factors, and any combination thereof at step 310. The traffic management module 102 then identifies one or more heavy hitting downlinks running over the eNodeB 106 for pacing during the predicted periods of congestion at step 312. The traffic management module 102 initiates pacing prior to the predicted period of congestion and terminates after the predicted period of congestion at step 314, which connects back to the training process at block 309.

The systems and methods described above address network congestion issues and apply flexible traffic management rules that accurately target sources of network congestion. The systems and methods detect and manage network data traffic during periods of network congestion from real-time network event and measurement data. The system and method may include tagging data flows with user device identification information to create an active database of devices associated with a Radio Access Network (RAN).

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A network load traffic management method comprising:
receiving a first dataset associated with a plurality of network components corresponding to a Radio Access Network (RAN), wherein the first dataset is communicated to a network traffic management module;
receiving a second dataset corresponding to a plurality of mobile device data flows, in which the second dataset is associated with a service provider network that includes the RAN, wherein the second dataset is communicated to the network traffic management module;
generating, at the network traffic management module, a first baseline with the first dataset for each RAN site in the service provider network, wherein the first baseline is generated with at least one of a first historical dataset and a first recent dataset;
generating, at the network traffic management module, a second baseline with at least one Key Performance Indicator (KPI) for each RAN site in the service provider network, wherein the baseline is generated with at least one of a historical KPI dataset and a recent KPI dataset;
tagging, at the network traffic management module, a data flow dataset with a plurality of mobile device identification information, wherein the data flow dataset is configured to be stored in a database, which is regularly updated with the data flow dataset;
associating the plurality of mobile devices that correspond to each RAN site based on a mobile device location;
determining, at the network traffic management module, a location change for each mobile device;
determining, at the network traffic management module, a probability for one or more mobile devices to remain within each location associated with each RAN site.

2. The method of claim 1 wherein determining the probability for one or mobile devices to remain within the location is configured to be associated with a particular RAN for a period of time.

3. The method of claim 1 further comprising generating a projection based on the baseline level of utilization, wherein the projection is associated with a future time period.

4. The method of claim 3 wherein access to the projection is provided with an Application Programming Interface (API).

5. The method of claim 1 wherein the first dataset includes a utilization dataset associated with the utilization of radio resources that includes a current utilization of radio resources.

6. The method of claim 5 wherein the utilization dataset associated with the utilization of radio resources includes a capacity utilization of radio resources.

7. The method of claim 1 wherein the KPI for each RAN site includes a mobility KPI associated with changing the mobile device location.

8. The method of claim 1 wherein the KPI for each RAN site includes a utilization KPI associated with the utilization of the network components.

9. A system for detecting and managing network data traffic, the system comprising:
a radio access network (RAN) associated with a service provider network, the RAN including a plurality of RAN sites, in which each RAN site has a coverage area;

a plurality of mobile devices communicatively coupled to the RAN;
a network load traffic management server that includes a traffic management module and a database that operate on a server processor and a server memory, wherein the network load traffic management server is communicatively coupled to the RAN;
a first dataset received by the network traffic management module, wherein the first dataset is associated with a plurality of network components corresponding to the RAN;
a second dataset received by the network traffic management module, wherein the second dataset corresponds to data flows associated with the plurality of mobile devices communicatively coupled to the RAN;
a first baseline generated with the first dataset for each RAN site in the service provider network by the network load traffic management module, wherein the first baseline is generated with at least one of a first historical dataset and a first recent dataset;
a second baseline generated with at least one Key Performance Indicator (KPI) for each RAN site in the service provider network, wherein the baseline is generated with at least one of a historical KPI dataset and a recent KPI dataset;
a data flow dataset that is tagged with an identification for each mobile device, wherein the data flow dataset is configured to be stored in the database, which is regularly updated with a recent data flow dataset associated with each mobile device;
the plurality of mobile devices associated with each RAN site based on a mobile device location;
a location change detected for each mobile device; and
a probability for one or more mobile devices to remain within each location associated with each RAN site, wherein the probability is calculated by the network traffic management module.

10. The system for detecting and managing network data traffic of claim 9 wherein the probability is determined for one or mobile devices to remain within the location associated with a particular RAN for a period of time.

11. The system for detecting and managing network data traffic of claim 9 further comprising a projection generated based on the baseline level of utilization, wherein the projection is associated with a future time period.

12. The system for detecting and managing network data traffic of claim 11 wherein access to the projection is provided with an Application Programming Interface (API).

13. The system for detecting and managing network data traffic of claim 9 wherein the first dataset includes a utilization dataset associated with the utilization of radio resources that includes a current utilization of radio resources.

14. The system for detecting and managing network data traffic of claim 13 wherein the utilization dataset associated with the utilization of radio resources includes a capacity utilization of radio resources.

15. The system for detecting and managing network data traffic of claim 9 wherein the KPI for each RAN site includes a mobility KPI associated with changing the mobile device location.

16. The system for detecting and managing network data traffic of claim 9 wherein the KPI for each RAN site includes a utilization KPI associated with the utilization of the network components.

17. A system for detecting and managing network data traffic, the system comprising:
a radio access network (RAN) associated with a service provider network, the RAN including a plurality of RAN sites, in which each RAN site has a coverage area;
a plurality of mobile devices communicatively coupled to the RAN;
a network load traffic management server that includes a traffic management module and a database that operate on a server processor and a server memory, wherein the network load traffic management server is communicatively coupled to the RAN;
a first dataset received by the network traffic management module, wherein the first dataset is associated with a plurality of network components corresponding to the RAN, wherein the first dataset includes a utilization dataset associated with the utilization of radio resources that includes a current utilization of radio resources;
a second dataset received by the network traffic management module, wherein the second dataset corresponds to data flows associated with the plurality of mobile devices communicatively coupled to the RAN;
a first baseline generated with the first dataset for each RAN site in the service provider network by the network load traffic management module, wherein the first baseline is generated with at least one of a first historical dataset and a first recent dataset;
a second baseline generated with at least one Key Performance Indicator (KPI) for each RAN site in the service provider network, wherein the baseline is generated with at least one of a historical KPI dataset and a recent KPI dataset;
a data flow dataset that is tagged with an identification for each mobile device, wherein the data flow dataset is configured to be stored in the database, which is regularly updated with a recent data flow dataset associated with each mobile device;
the plurality of mobile devices associated with each RAN site based on a mobile device location;
a location change detected for each mobile device;
a probability for one or more mobile devices to remain within each location associated with each RAN site for a period of time, wherein the probability is calculated by the network traffic management module;
a projection generated based on the baseline level of utilization, wherein the projection is associated with a future time period, wherein access to the projection is provided with an Application Programming Interface (API).

18. The system for detecting and managing network data traffic of claim 17 wherein the utilization dataset associated with the utilization of radio resources includes a capacity utilization of radio resources.

19. The system for detecting and managing network data traffic of claim 17 wherein the KPI for each RAN site includes a mobility KPI associated with changing the mobile device location.

20. The system for detecting and managing network data traffic of claim 17 wherein the KPI for each RAN site includes a utilization KPI associated with the utilization of the network components.

* * * * *